United States Patent [19]
Masuda

[11] Patent Number: 5,844,726
[45] Date of Patent: Dec. 1, 1998

[54] POSITION DETECTING DEVICE

[75] Inventor: Hidetoshi Masuda, Yokohama, Japan

[73] Assignee: Canon Kabushiki Kaisha, Tokyo, Japan

[21] Appl. No.: 800,204

[22] Filed: Feb. 12, 1997

[30] Foreign Application Priority Data

Feb. 20, 1996 [JP] Japan .................................. 8-031875

[51] Int. Cl.$^6$ .................................................. G02B 15/14

[52] U.S. Cl. ........................ 359/697; 359/694; 359/823; 359/698; 359/824; 250/201.2; 396/102

[58] Field of Search ..................................... 359/698, 697, 359/694, 695, 822, 823; 250/201.1, 201.2, 201.4; 396/102, 104, 133

[56] References Cited

U.S. PATENT DOCUMENTS

| | | | |
|---|---|---|---|
| 5,079,582 | 1/1992 | Hamada et al. | 250/201.2 |
| 5,225,941 | 7/1993 | Saito et al. | 359/824 |
| 5,267,085 | 11/1993 | Sasaki et al. | 359/694 |
| 5,291,335 | 3/1994 | Ogino | 359/823 |
| 5,327,070 | 7/1994 | Seki et al. | 359/698 |
| 5,587,846 | 12/1996 | Miyano et al. | 359/824 |

*Primary Examiner*—Loha Ben
*Attorney, Agent, or Firm*—Robin, Blecker & Daley

[57] ABSTRACT

A position detecting device includes a moving body, and a detection mechanism which detects a moving position of the moving body on the basis of a level of a detection signal, wherein a peak value of the level of the detection signal is set to be obtained at an intermediate point within a moving range of the moving body.

16 Claims, 6 Drawing Sheets

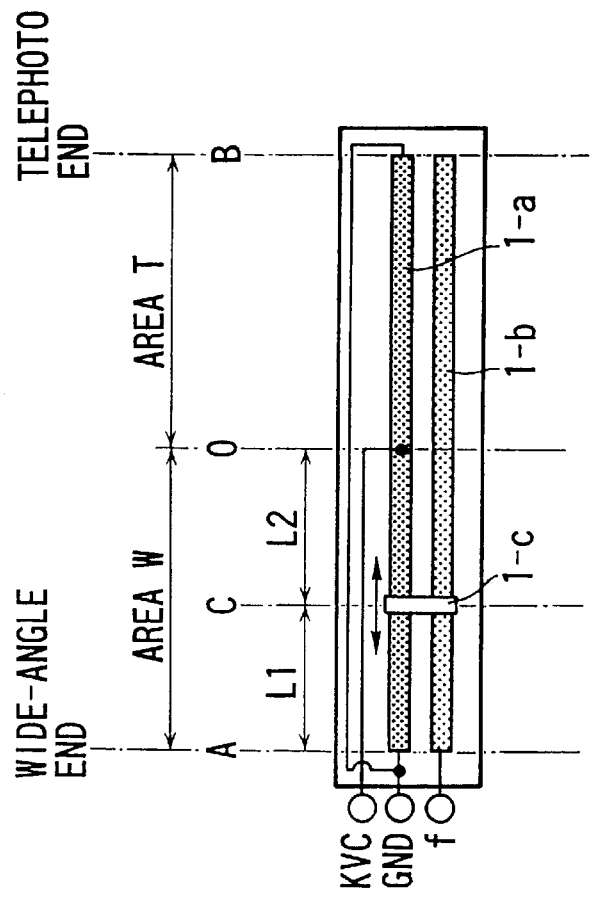
F I G. 1 ( a )
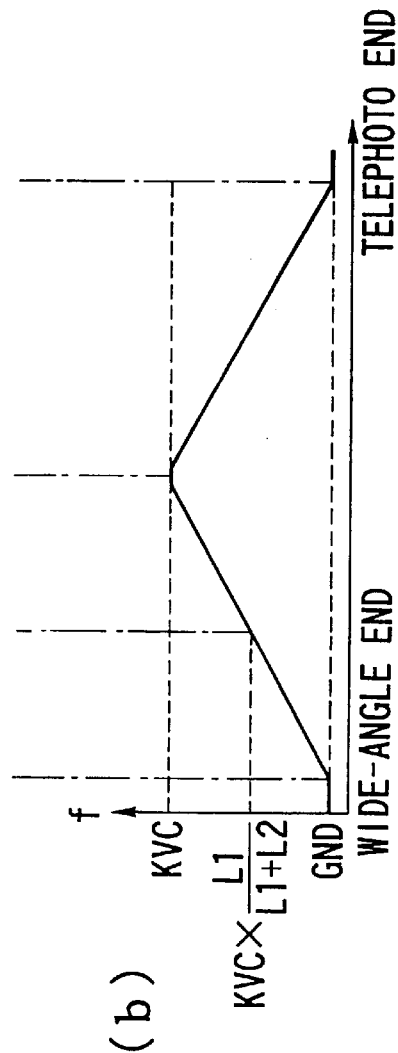
F I G. 1 ( b )

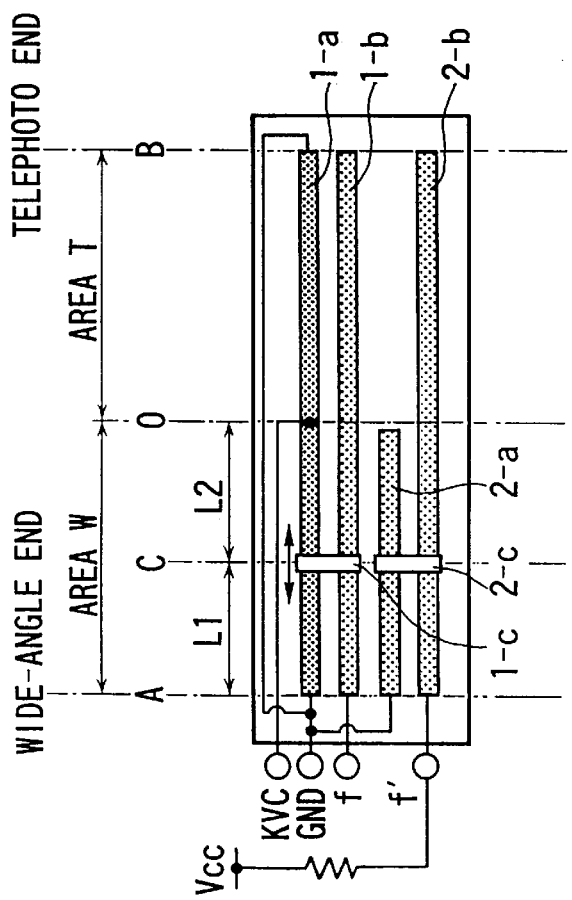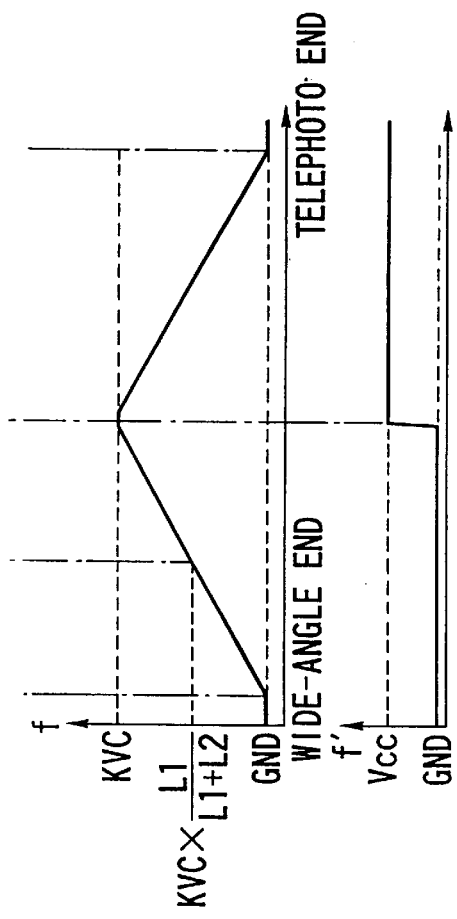
FIG.2(a)
FIG.2(b)

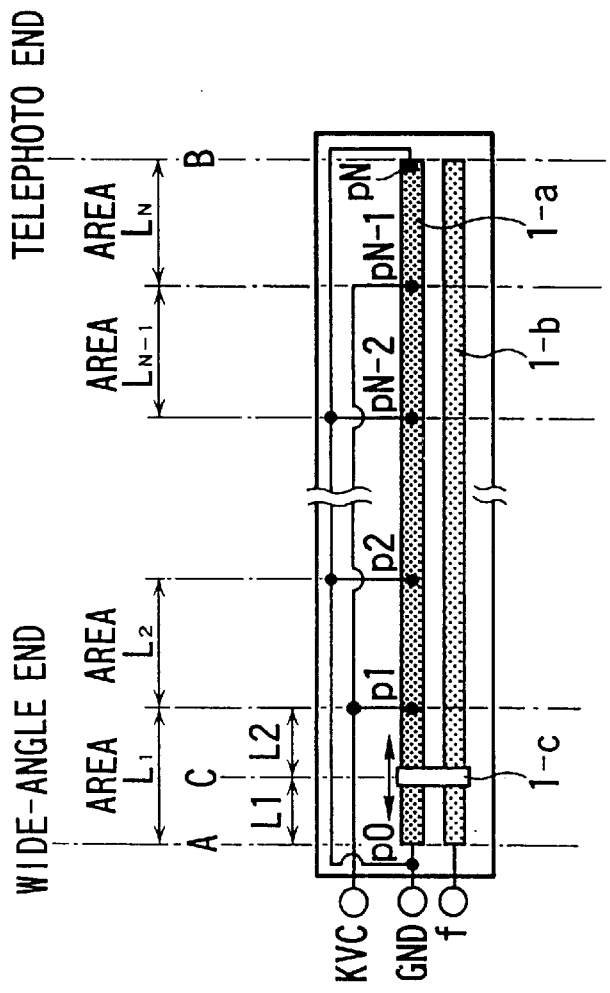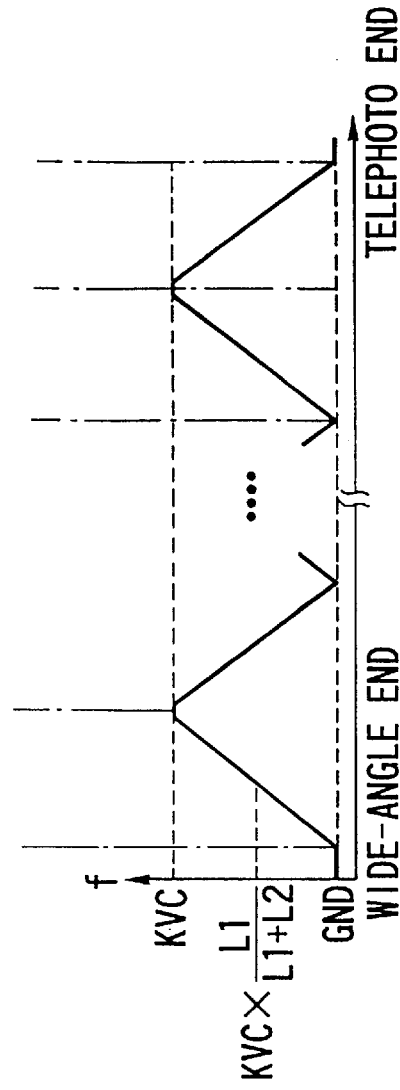
F I G. 3 (a)
F I G. 3 (b)

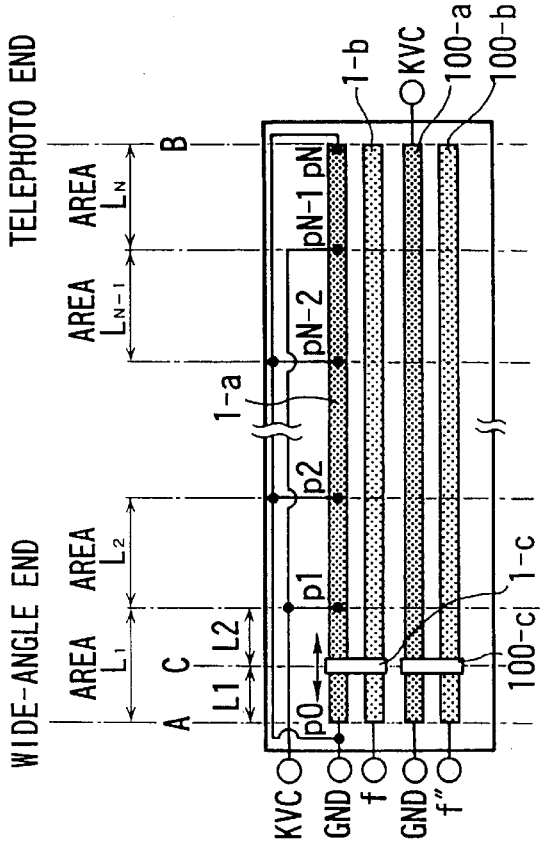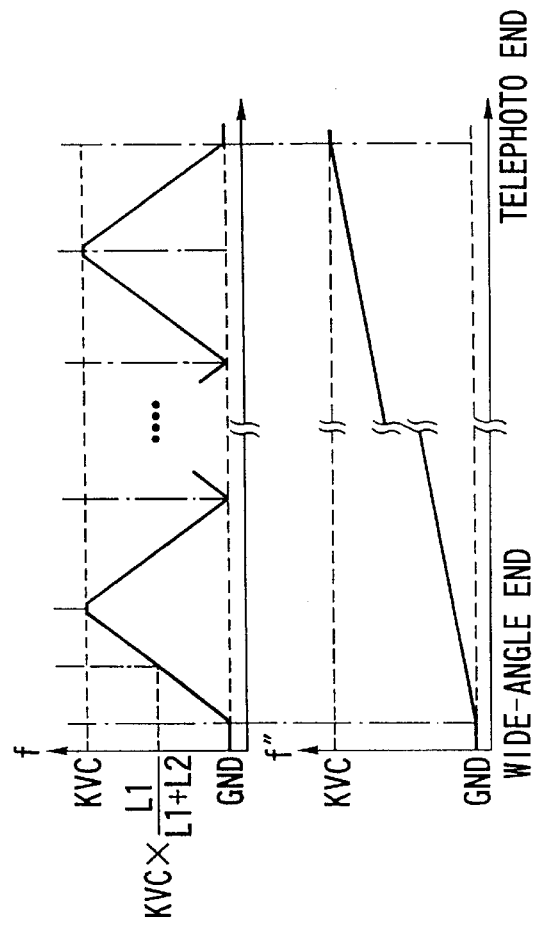
FIG. 4(a)
FIG. 4(b)

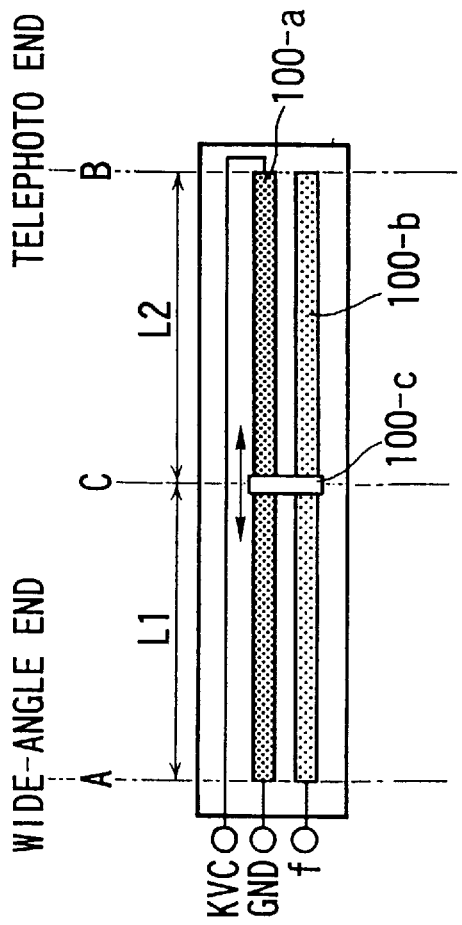
F I G. 6 (a)
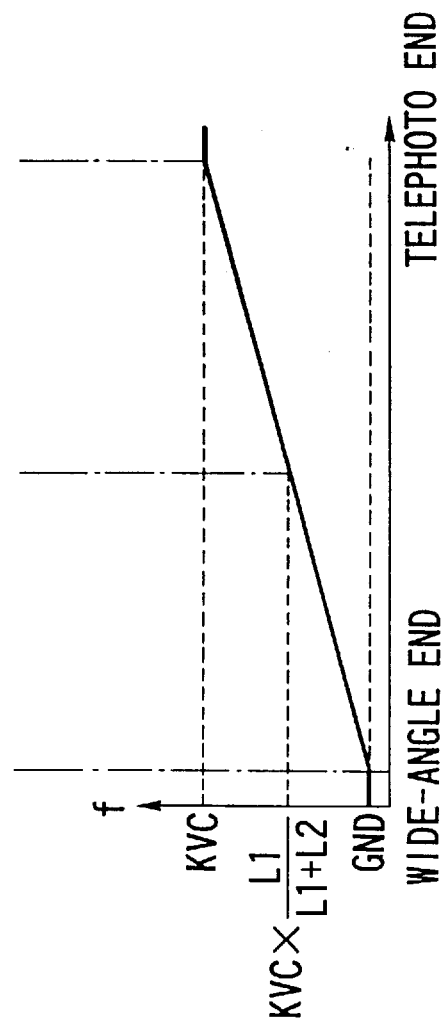
F I G. 6 (b)

POSITION DETECTING DEVICE

BACKGROUND OF THE INVENTION

1. Field of the Invention

This invention relates to a position detecting device for detecting the moving position of a moving body.

2. Description of Related Art

It is conventional practice that a power zooming mechanism in a lens barrel is driven by one motor and a cam ring mechanism. The arrangement for driving all lens groups constituting a zoom lens by means of one motor and a cam ring mechanism which is interlocked with the motor, however, imposes limitations on attempts to reduce the size of the zoom lens and to increase its magnifying power. To solve this problem, in Japanese Laid-Open Patent Application No. HEI 4-171409, there is disclosed a control system by which a plurality of lens groups constituting a zoom lens is controlled by using a plurality of drive sources independently of each other. The control system disclosed facilitates control over a zoom lens of a so-called rear-focus type, which has been difficult to control so far.

In controlling a rear-focus type zoom lens by using a plurality of drive sources as mentioned above, it is necessary not only to accurately detect and control the absolute position of a zooming lens, i.e., a zooming optical system (hereinafter referred to as a lens Z), but also to accurately control a focusing lens, i.e., a focusing optical system (hereinafter referred to as a lens L), which is drivable independently of the control over the lens Z.

FIG. 5 shows in a block diagram the arrangement of the control system for controlling each of lens components of a rear-focus type zoom lens by using a plurality of drive sources.

Referring to FIG. 5, the control system includes a lens (Z) 1 serving as a zooming optical system, a motor 2 arranged to drive the lens Z, a lens (L) 3 serving as a focusing optical system, a motor 4 arranged to drive the lens L, a motor driver circuit 5 arranged to drive the motors 2 and 4, an encoder 6 arranged to convert the absolute position of the lens Z into an electrical signal, an encoder 7 arranged to convert the position of the lens L into an electrical signal, and an A/D converter 8 arranged to receive a signal outputted from the encoder 6 and convert the signal into digital data.

The control system further includes a distance measuring device 9 arranged to output information on a photographing distance, operation switches 10 and 11 provided for zooming operations for zooming toward a telephoto end position and toward a wide-angle end position, respectively, a switch 12 arranged to be turned on by the first stroke of an operation performed on a photographing button, a switch 13 arranged to be turned on by a further stroke of the operation on the photographing button, and a CPU 20 arranged to perform central control over these parts.

When the zooming operation switch 10 or 11 is operated by the operator of the camera, the switch operation is detected by the CPU 20. The CPU 20 then controls and causes the motor driver circuit 5 to drive the motor 2. The motor 2 causes the position of the lens Z to move toward the telephoto end position or the wide-angle end position. The driving action is brought to an end when the operation switch 10 or 11 is found to have been released from the state of being operated. Further, the driving action is brought to an end also upon detection of the fact that the lens Z has reached a telephoto or wide-angle end position through the encoder 6 and the A/D converter 8.

The switch 12 is turned on when the photographing button is pushed to the extent of the first stroke. Upon detection of the turning-on of the switch 12, the CPU 20 obtains from the distance measuring device 9 photographing distance information, i.e., a distance from the camera to a photographing object on which the zoom lens is to be focused. The CPU 20 then decides a position of the lens L according to the photographing distance information x and information f which is outputted from the A/D converter 8. The CPU 20 causes the motor driver circuit 5 and the motor 4 to drive the lens L to the position decided.

The conventional arrangement of the encoder 6 which is provided for detection of the position of the lens Z is known as shown in FIG. 6(a). In FIG. 6(a), reference numeral 100-a denotes a resistance pattern in which a resistance value per unit length is uniform, reference numeral 100-b denotes a conducting pattern in which no resistance component is included, and reference numeral 100-c denotes a conducting member which includes no resistance component and is arranged to move on the patterns 100-a and 100-b according to the mechanical movement of the lens Z.

One end of the resistance pattern 100-a is connected to a ground point (hereinafter referred to as a point GND). The other end of the resistance pattern 100-a is connected to a reference power source KVC which is supplied from the CPU 20. One end of the conducting pattern 100-b is taken out as an electrode f. The electrode f is arranged to give an input signal to the A/D converter 8. Referring to FIG. 6(a), as the lens Z moves from a wide-angle end to a telephoto end, the conducting member 100-c also moves on the patterns 100-a and 100-b from a point A to a point B.

With the encoder 6 configured in this manner, the electrode f outputs a signal as shown in FIG. 6(b). With a point C assumed to be located on the patterns 100-a and 100-b at a distance L1 from the point A and at a distance L2 from the point B, the signal obtained when the lens Z is at the point C can be expressed as "f=KVC×L1 (L1 +L2)". The signal can be expressed as f=GND when the lens Z is located at the point A and as f=KVC when the lens Z is located at the point B. The signal f thus obtained is supplied to the A/D converter 8. The data thus obtained and outputted from the A/D converter 8 is supplied to the CPU 20 to be used in determining the position of the lens Z.

According to the conventional example described above, the signal f which varies with the position of the lens Z in a ratio of 1:1 over the entire moving range of the lens Z is inputted to the A/D converter 8. Therefore, in this case, the quantizing units of detection of positions of the lens Z are determined by the resolution and the conversion error of the A/D converter 8. In order to enhance the accuracy of detection of the position of the lens Z, the A/D converter 8 must be improved in resolution and in conversion accuracy.

However, use of a high-accuracy A/D converter causes an increase in cost. Further, even if the detection accuracy of the A/D converter is increased, some external noises from a power supply line, etc., come to mix in the signal f which is shown in FIG. 6(b). In actuality, the amplitude of such an external noise is hardly ignorable.

To lower the external noise, it becomes necessary to use a filter circuit or the like, which causes an increase in scale of the arrangement. In other words, in accordance with the conventional example, a possible extent of improvement in accuracy for detection of the position of the lens Z while avoiding the above-stated problem without any complex arrangement is limited.

BRIEF SUMMARY OF THE INVENTION

In accordance with one aspect of this invention, there is provided a position detecting device comprising position detecting means having a detection signal level varied according to a movement of a moving body, in which a peak value of the detection signal level is set to be obtained at an intermediate point within a moving range of the moving body, so that the amount of variation of the detection signal level with respect to a predetermined amount of movement of the moving body can be increased.

The above and other aspects and features of this invention will become apparent from the following detailed description of embodiments thereof taken in connection with the accompanying drawings.

BRIEF DESCRIPTION OF THE SEVERAL VIEWS OF THE DRAWING

FIGS. 1(a) and 1(b) show an encoder included in a lens driving device according to a first embodiment of this invention, specifically, FIG. 1(a) showing the arrangement of the encoder and FIG. 1(b) showing the waveform of a signal outputted from the encoder.

FIGS. 2(a) and 2(b) show an encoder included in a lens driving device according to a second embodiment of this invention, specifically, FIG. 2(a) showing the arrangement of the encoder and FIG. 2(b) showing the waveform of a signal outputted from the encoder.

FIGS. 3(a) and 3(b) show an encoder included in a lens driving device according to a third embodiment of this invention, FIG. 3(a) showing the arrangement of the encoder and FIG. 3(b) showing the waveform of a signal outputted from the encoder.

FIGS. 4(a) and 4(b) show an encoder included in a lens driving device according to a fourth embodiment of this invention, FIG. 4(a) showing the arrangement of the encoder and FIG. 4(b) showing the waveform of a signal outputted from the encoder.

FIGS. 6(a) and 6(b) show the conventional encoder included in a lens driving device, FIG. 6(a) showing the arrangement of the encoder and FIG. 6(b) showing the waveform of a signal outputted from the encoder.

Figure 5:
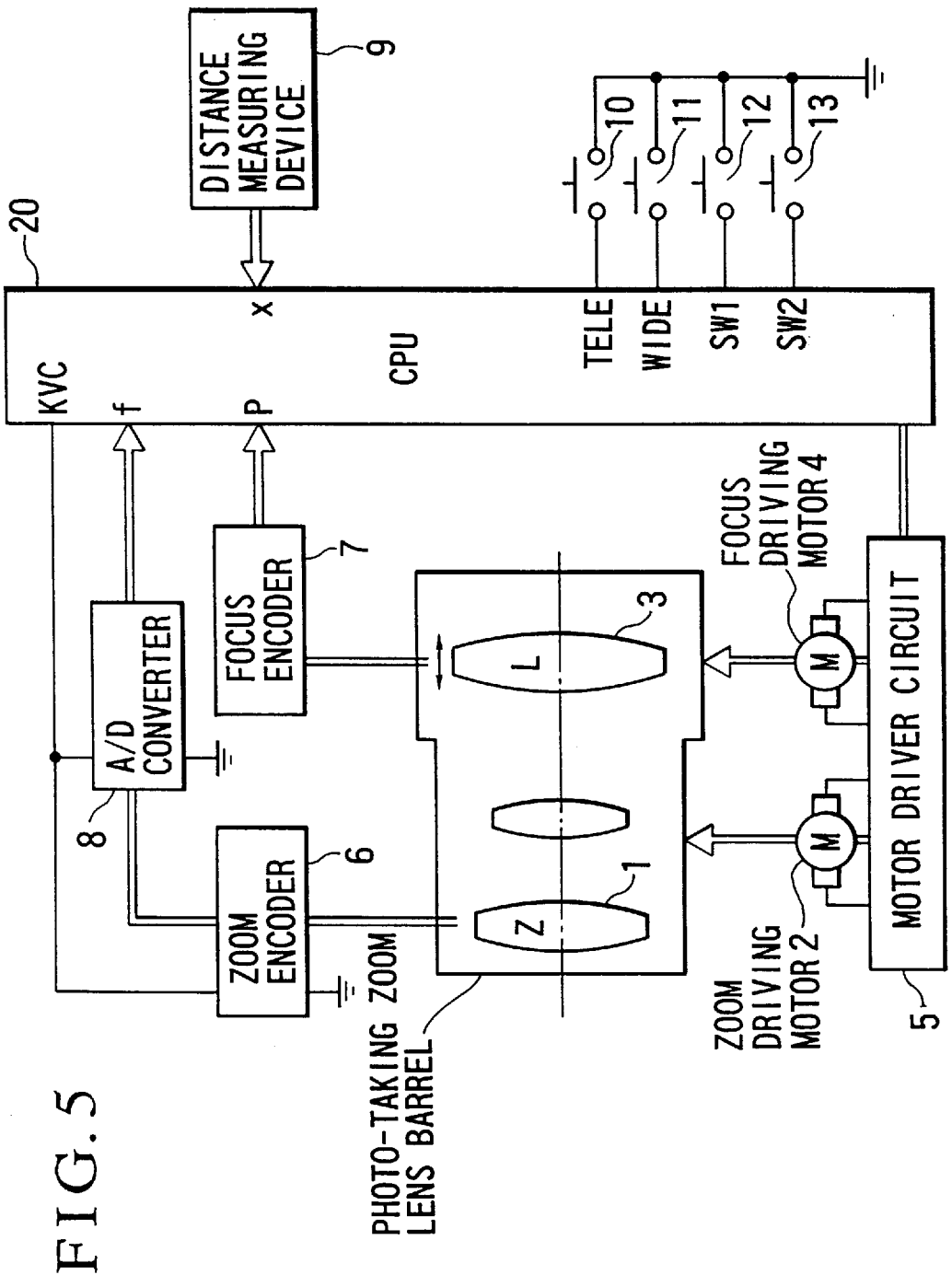
FIG. 5 is a block diagram showing the arrangement of a lens driving device.

DETAILED DESCRIPTION OF THE INVENTION (First Embodiment)

FIGS. 1(a) and 1(b) show a zoom encoder included in a lens driving device according to a first embodiment of this invention. The arrangement of the lens driving device is the same as the arrangement shown in FIG. 5. Therefore, the arrangement of the lens driving device is omitted from the illustrations.

FIG. 1(a) shows the arrangement of the zoom encoder included in the lens driving device.

In FIG. 1(a), reference numeral 1-a denotes a resistance pattern in which a resistance value per unit length is uniform, reference numeral 1-b denotes a conducting pattern in which no resistance component is included, and reference numeral 1-c denotes a conducting member which includes no resistance component and is arranged to move on the patterns 1-a and 1-b according to the mechanical movement of the lens Z. Both ends of the resistance pattern 1-a are connected to a ground point (a point GND). A point O located between two end points A and B of the resistance pattern 1-a is connected to a reference power source KVC.

One end of the conducting pattern 1-b is taken out as an electrode f. The electrode f is arranged to give an input signal to the A/D converter 8. Referring to FIG. 1(a), as the lens Z moves from a wide-angle end to a telephoto end, the conducting member 1-c also moves on the patterns 1-a and 1-b from the point A to the point B. In the encoder configured as mentioned above, a signal outputted from the electrode f becomes as shown in FIG. 1(b). Thus, the signal level becomes the same ground level (GND) at both the points A and B and reaches a reference voltage KVC at the point O.

With the encoder configured in this manner, the level of the signal f, i.e., the signal outputted from the electrode, varies from the level of the reference voltage KVC to the ground level GND as the lens Z moves in an area W from the point O to the point A and in an area T from the point O to the point B among the moving range of the lens Z between the points A and B. In other words, in the encoder according to this embodiment, a peak value of a detection signal level is obtained at an intermediate point within the moving range of the lens Z. Accordingly, if the A/D converter 8 has the same degree of accuracy as that of the conventional example, the resolution of the encoder according to this embodiment is twice as high as that of the encoder shown in FIGS. 6(a) and 6(b).

With the A/D converter assumed, for example, to be of the degree of accuracy of 8 bits, while the moving range from the wide-angle end to the telephoto end can be divided into 256 steps according to the conventional example shown in FIG. 6(b), the moving range can be divided, according to this embodiment, into 512 steps, giving a detecting resolution twice as high as the resolution of 256 steps of the conventional example. Thus, since the quantizing unit of the detection voltage is exactly the same in both cases, the reliability of detection is not deteriorated by external noises in this embodiment.

In this embodiment, while the detecting resolution is increased by two times, the position of the lens Z and the signal f are brought into a one-to-two correspondence relation. This relation makes it impossible to discriminate between the area W and the area T by using only the signal f, so that the position of the lens Z cannot be identified. Therefore, in order to identify the position of the lens Z, the inclination of variation of the signal f must be detected during the process of driving the lens Z. To be more specific, during the process of driving the lens Z toward the telephoto end position (to the right as viewed in the drawing), the conducting member 1-c (lens Z) can be determined to be in the area W if the variation of the signal f has a positive inclination or to be in the area T if the variation of the signal f has a negative inclination.

(Second Embodiment)

FIGS. 2(a) and 2(b) show an encoder included in a lens driving device according to a second embodiment of this invention. The arrangement of the lens driving device is the same as the arrangement shown in FIG. 5. The lens driving device is, therefore, omitted from the illustrations. Further, in FIG. 2(a), all the parts which are the same as those of the arrangement shown in FIG. 1(a) are indicated by the same reference numerals and the details of them are omitted from the following description.

FIG. 2(a) shows the arrangement of the zoom encoder of the lens driving device. In the case of the second embodiment, the zoom encoder is provided, in addition to the arrangement of the first embodiment, with conducting patterns 2-a and 2-b which include no resistance component and are disposed in parallel to the conducting pattern 1-b, so as to discriminate between the area W and the area T by using another detection signal outputted from an electrode f'.

The conducting pattern 2-a is disposed between the points A and O correspondingly with the area W. The other conducting pattern 2-*b* is disposed between the points A and B. The electrode f' outputs a signal of a ground level (a low level) while a conducting member 2-*c* arranged to move integrally with the conducting member 1-*c* is moving in the area W, and outputs a signal of a Vcc level pulled up to a power supply voltage Vcc (a high level) while the conducting member 2-*c* is moving in the area T.

Unlike in the case of the first embodiment, the arrangement of the second embodiment enables the CPU 20 to find the absolute position of the lens Z (1) through the signals outputted from the electrodes f and f' even if the lens Z (1) is in a stopped state.

(Third Embodiment)

FIGS. 3(*a*) and 3(*b*) show a zoom encoder included in a lens driving device according to a third embodiment of this invention. FIG. 3(*a*) shows the arrangement of the encoder 6 according to the third embodiment of this invention. In FIG. 3(*a*), all the parts which are the same as those of the arrangement shown in FIG. 1(*a*) are indicated by the same reference numerals and the details of them are omitted from the following description. While the first and second embodiments are arranged to double the detection accuracy (resolution), the third embodiment is arranged to further enhance the detection accuracy by multiplying it N times as desired.

Referring to FIG. 3(*a*), the driving range of the zoom lens is divided into a plurality (N) of areas Li (i=1, 2, ---, N). The point GND and the source of a reference voltage KVC are alternately connected to electrodes pj (j=0, 1, 2, ---, N) which are disposed at boundaries between the plurality of areas Li of the resistance pattern 1-*a*. As shown in FIG. 3(*b*), a signal outputted from the electrode f for each of the plurality of areas Li varies from the ground (GND) level to the level of the reference voltage KVC and vice versa. Therefore, the arrangement of the third embodiment enhances the detection accuracy by N times as compared with that of the conventional example shown in FIG. 6(*b*).

(Fourth Embodiment)

FIGS. 4(*a*) and 4(*b*) show a zoom encoder included in a lens driving device according to a fourth embodiment of this invention. Referring to FIG. 4(*a*), the fourth embodiment is arranged to include the patterns shown in FIG. 6(*a*), in addition to the arrangement of the third embodiment shown in FIG. 3(*a*), and to utilize a signal obtained from an electrode f'' of the conducting pattern 100-*b* as a coarse position detection signal. More specifically, the absolute position of the lens Z (1) is detected as an approximate position (the area Li) through the signal outputted from the electrode f'' and, after that, a signal outputted from the electrode f is used for exactly detecting the position of the lens Z.

In each of the embodiments described above, the zoom encoder 6 which is provided for detection of the position of the lens Z (1) serving as a zooming optical system has been solely described. However, this invention applies in exactly the same manner also to the encoder 7 which is provided for detection of the position of the lens L (3) serving as a focusing optical system.

In cases where a lens position detecting means is arranged to set maximum and minimum values respectively at the two ends of the moving range of the lens and, for example, to A/D (analog-to-digital) convert a detection signal, the resolution of the A/D converter is set for the entire moving range of the lens. According to the arrangement of each of the embodiments described above, on the other hand, the resolution of the A/D converter can be used for an intermediate area or areas of the moving range of the lens, so that the position detection accuracy for the lens can be enhanced without recourse to any complex arrangement.

Further, according to the arrangement of each of the second, third and fourth embodiments, the position detection accuracy can be enhanced by as much as the number of the divided areas of the moving range of the lens.

I claim:

1. A position detecting device comprising:

a moving body; and a detection mechanism which detects a moving position of said moving body on the basis of a level of a detection signal, wherein a peak value of the level of the detection signal is set to be obtained at an intermediate point within a moving range of said moving body.

2. A device according to claim 1, wherein said detection mechanism is arranged to divide the moving range of said moving body into a plurality of areas, and a peak value of the level of the detection signal is set to be obtained within each of the divided areas.

3. A device according to claim 1, wherein both increase and decrease of the level of the detection signal occur as said moving body moves from one end to another end of the moving range thereof.

4. A device according to claim 3, wherein the detection signal becomes the same level at a plurality of moving positions of said moving body as said moving body moves.

5. A device according to claim 4, wherein said detection mechanism identifies the moving position of said moving body according to whether the level of the detection signal varies to increase or decrease.

6. A device according to claim 3, further comprising a circuit which converts the detection signal into digital data.

7. A device according to claim 1, wherein the detection signal becomes the same level at a plurality of moving positions of said moving body as said moving body moves.

8. A device according to claim 1, wherein said detection mechanism identifies the moving position of said moving body by using, in addition to the level of the detection signal, a second detection signal obtained by coarsely detecting the moving position of said moving body.

9. A device according to claim 8, wherein each of the first-mentioned detection signal and the second detection signal is a voltage value.

10. A device according to claim 1, wherein the detection signal is a voltage value.

11. A device according to claim 1, further comprising a circuit which converts the detection signal into digital data.

12. A device according to claim 11, wherein said moving body is an optical lens.

13. A device according to claim 12, wherein said moving body is an optical lens for varying magnification.

14. A device according to claim 12, wherein said moving body is an optical lens for focusing.

15. A device according to claim 12, further comprising a circuit which causes said optical lens to move further on the basis of a result of detection of the moving position of said optical lens.

16. A device according to claim 15, wherein said circuit includes a microcomputer.

* * * * *